N. Aubin.
Gas Generator.
Nº 17614.  Patented Jun. 23, 1857.
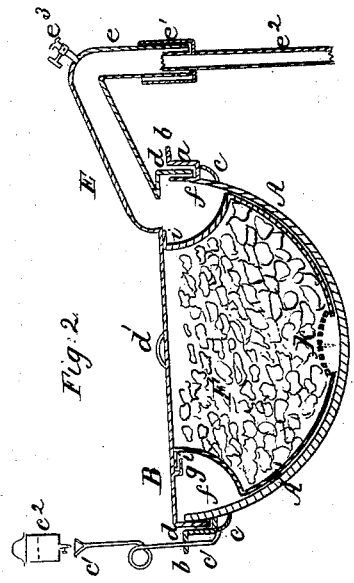
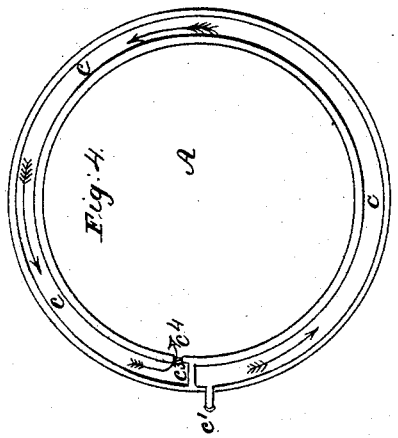
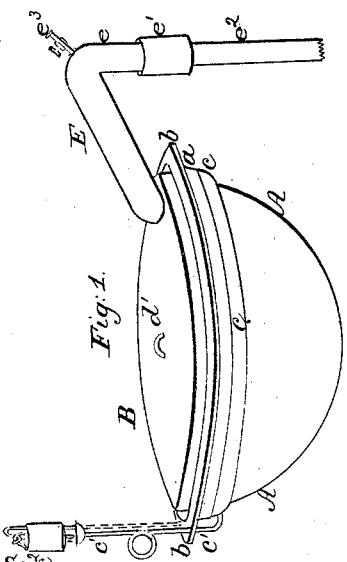
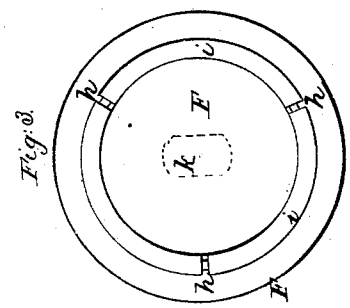
Witnesses:
Inventor;
N. Aubin

UNITED STATES PATENT OFFICE.

N. AUBIN, OF ALBANY, NEW YORK.

GAS-GENERATOR.

Specification of Letters Patent No. 17,614, dated June 23, 1857.

*To all whom it may concern:*

Be it known that I, NAPOLEON AUBIN, of Albany, in the county of Albany and State of New York, have invented new and useful Improvements in Gas-Generators; and I do hereby declare that the same are described and represented in the following specification and drawings.

The nature of my improvements consists in making a gas generator composed of a retort with a shallow bottom of a semispheroidal or other equivalent form, containing a vessel or charger which is nearly a counterpart of its interior surface, for the purpose of introducing the gas making materials into the retort in such a manner as to leave no vacant space for the gas to remain where it has been generated—the said charger being attached to the cover if desired so as to enable the operator to charge and close the retort at one operation; and so arranged that the charger alone, or the charger and cover if connected together, can have an oscillating or jumping motion caused by the escape of gas from under it—the whole device being so constructed, that it extracts from a given quantity of materials a larger quantity of illuminating gas, and of a better quality, than any other apparatus, is not exposed to clog, is very easily managed, is adapted to extract gas from any material containing it, and when the part most exposed to the fire is destroyed by oxidation or otherwise, it can be replaced in a few minutes without disturbing any other part of the apparatus.

To enable others skilled in the art to make and use the same, I will proceed to describe its construction and use, referring to the drawings, in which the same letters indicate like parts in each of the figures.

Figure 1 is a perspective view of the gas generator. Fig. 2 is a vertical section of the same across the middle, showing the whole apparatus in working condition. The section of the retort and of all the parts attached to it is tinted in gray, that of the cover is blue, and the charger red. Fig. 3 is a bird's eye view of the charger detached from the cover. Fig. 4 is a plan of the steam generating and heating chamber.

A, A, is the decomposing retort. It is a vessel of cast iron, clay or other fit material, of a circular, elliptical or other form, the lower part or bottom of which is semispheroidal, or of any other shape generated by a semi-revolution of half its periphery, observing that the mouth of the vessel must in every case be wider than any other part below it. It can be made of any size from seven or eight inches in diameter, calculated for the wants of a small family, to any dimension required in large city works.

$a\ a$ is a groove cast or made around the mouth of the retort A, for the purpose of closing it by means of a liquid joint. This groove is made deep enough to allow the cover, the rim of which dips into it, to oscillate freely, and yet preserve sufficient immersion in the liquid of the groove to counterbalance and overcome the pressure of the gas holder and main. The object of this arrangement will be shown in explaining the operation of the apparatus.

$b\ b$ is a horizontal flange placed outside the wider part of the retort, for the purpose of supporting it when placed over the fire of a furnace built for it, or of the ordinary range of a kitchen.

$c\ c$ is a channel cast around the retort, or on part of its periphery under the groove $a$. This channel has for its object the generating and superheating of steam to be introduced into the retort when required, as will be explained hereafter.

$c'$, is a siphon pipe connected to the steam channel $c$ and through which water can be introduced drop by drop as required.

$c^2\ c^2$ is a water vessel placed above the siphon $c'$, and from which water is made to drop when desired through a cock or other arrangement.

$c^3$ is a partition or diaphragm which forces the steam to circulate around the retort; $c^4$, aperture through which the steam passes from the steam channel $c$ into the retort A.

The above described steam attachment does not form an essential part of the retort A, for it can be dispensed with in some cases; but being very useful in certain circumstances (as will be stated hereafter) I have described it here.

B, is the cover of the retort; it has a rim $d$, $d$, dipping into the liquid contained in the groove $a$ for the purpose of closing the retort; $d'$ perforated lug for raising the cover.

E is the exit pipe conducting the gas from the retort to the coolers, purifier, and gasholder. The end of the branch $e\ e$ dips into a double socket $e'\ e'$ filled with water tar, or other liquid, so as to form a gas-tight joint without bolting a packing. $e^2\ e^2$, dip pipe attached to the hydraulic main, to the cooler, or to the gasholder, according to circumstances. $e^3$, $e^3$, try cock, by which the operator ascertains how gas is being generated, and when the charge requires to be removed. F, oscillating charger; it is a vessel made of thin cast iron or of sheet metal, the upper part of which is of a smaller diameter than the mouth of the retort, so as to leave around it, and between it and the interior of the retort the vacant space $ff$, from which the generated gas can enter the exit pipe E and be conducted to the main or gas holder. The lower part of the charger is made to correspond to the interior surface of the retort, so that when it is put in its place it lies on the bottom of the retort, which it fits, thus leaving but little or no space between it and the surface of the retort. This charger may be cast with the cover, or independent of it, but I prefer constructing it so that it may be attached to the cover by means of three catches $g$ passing in the slits $h$, $h$, $h$, of the flange $i\ i$ of the charger, packed with clay, iron rust, or putty.

When the charger is worn out from long use, it can be replaced by a new one without loosening the cover which does not destroy. In the center of the bottom of the charger is left an oblong or elliptical aperture $k$, covered by a movable grate.

The apparatus being constructed as above described, the retort A is placed over a fire and heated to a cherry red, the cover B with its charger F filled with gas-making materials, such as bituminous coal, asphaltum, rosin, grease, cotton seed, dried bark, sawdust from resinous wood, oils, oil cake, tar, peat, &c., such substances being used either separately or mixed together in such proportions as are known to be most advantageous by persons skilled in the art, is placed in the position shown in Fig. 2, so that the bottom of the charger rests on the interior surface of the bottom of the retort, the rim $d$ of the cover dips in the groove $a$, and the branch $e$ of the exit pipe E dips into the double socket $c$, so that the interior of the retort be made to communicate with the gas-holder, and the apparatus yet be made gas tight at once without bolts, wedges, or packing.

The operation of the generator is then as follows: The gas-making materials in the cavity of the charger being exposed to the heat of the retort (which penetrates through the metal of the charger,) soon evolve hydrocarbon vapors, which, by their own pressure, pass down through the aperture $k$ and coming in contact with the bottom of the retort, are there transformed into gas; this gas, by its sudden expansion raises the charger, which, by falling again in its position, expels the gas from the space in which it was generated, and thus a continuous oscillating or jumping motion of the charger and cover occurs, which forces the hydrocarbon vapors to come in close contact with the red-hot bottom of the retort, and at the same time prevents the newly-generated gas from remaining exposed to the red heat, which, as is well known, would decompose it again, and precipitate the carbon previously combined with it, thus causing the carbonaceous deposit which is found so detrimental to the decomposing power of the retort, and so troublesome in its removal.

When a charge has been deprived of all the gas which it contains, the cover, with its charger, is raised, the residuum, if any remains, is emptied out, new materials are introduced into the cavity of the charger, the grate $k$ is put in its position, the cover and charger are replaced as above described, and the operation continues as before. Some materials are found to be more difficult of decomposition than others, from their containing hydrogen and carbon in different proportions, and are therefore more apt to generate a larger proportion of tar and to clog the open space of retorts and exit pipes. Such are some kinds of bituminous coals, asphaltum, rosin oil, etc. When such materials are used, I find it more particularly necessary to introduce into the retort a current of superheated steam; for that purpose I let some water drop from the vessel $c^2$ through the siphon $c'$ into the channel $c$, where it is transformed into steam, which, in traveling in the direction of the arrows (Fig. 4), acquires a high degree of heat and passes into the retort through the aperture $c^4$. This steam drives the gas rapidly out of the retort, and effectually prevents all deposit which otherwise would occur in the upper and colder part of the retort, as well as in the exit pipe.

When it is desirable to make gas from liquid materials, such as oils, tar, naphtha or other liquid hydrocarbons, I introduce them either mixed with other substances, or allow them to run through the cover into the charger previously filled with pieces of coke or charcoal.

When large retorts are used, such as are required for generating considerable quantities of gas from coal, or other comparatively bulky material, the cover and charger are raised and turned by means of a crane or other suitable mechanical contrivance.

The above described apparatus possesses many advantages over previously known devices.

1st. The retort being independent and having no neck nor any other connecting pipe attached to it, and being merely placed over a fire, it is very economical and can be replaced in a few minutes by any one, and without other cost than that of the metal.

2d. The form of the charger being a counterpart of the interior surface of the heated part of the retort, no particle of vaporizable gas-making material can escape without traversing over and between the surfaces of two red hot plates closely contiguous; therefore a much larger decomposing surface is secured, and a much greater proportion of gas is obtained from a given quantity of materials than with any other known apparatus.

3d. The heated surface preserves its decomposing power, no carbon being deposited on it, as the gas is expelled as soon as generated by the oscillating motion of the charger.

4th. The operation of charging and closing the retort and of connecting it with the main is performed at one and the same time.

5th. The shape of the retort is such, and its decomposing surface so considerable in proportion to its size and weight, that it can be placed over the fire of a kitchen range, after the meals of the family are cooked, like an ordinary boiler—thereby saving the expense and trouble of lighting a fire; and its operation is so simple that it can be managed by any servant.

6th. My apparatus is better adapted for making coal gas than the ordinary horizontal retorts, as all the vapors arising from the coal are forced to pass downward through the layer of coke first formed next to the interior surface of the charger, and afterward have to travel between the heated surfaces of the retort and charger, thus insuring a more perfect decomposition of materials, a great reduction in the quantity of tar, and a much larger proportion of gas of a good and more uniform quality.

In horizontal coal gas retorts much of the vapor liberated passes out of the retort without coming in actual contact with its heated surface, and is condensed into tar, while in my apparatus it is converted into gas.

I do not claim the mixing of materials for making gas, nor the introducing of gas making materials into a retort by means of a charger, nor the described method of closing the retort, nor the introduction of highly heated steam into the retort; for such devices have been either known, used, or patented before.

What I do claim as my invention and desire to secure by Letters Patent, is—

The use of a charger arranged and operated substantially as set forth in the above specification.

N. AUBIN.

Witnesses:
D. M. PECK,
LEONARD KIP.